(12) United States Patent
Lee et al.

(10) Patent No.: US 11,660,591 B2
(45) Date of Patent: May 30, 2023

(54) CATALYST REGENERATOR AND CATALYST REGENERATION METHOD

(71) Applicants: KOREA INSTITUTE OF MACHINERY & MATERIALS, Daejeon (KR); KOREA RESEARCH INSTITUTE OF CHEMICAL TECHNOLOGY, Daejeon (KR)

(72) Inventors: Dae-hoon Lee, Daejeon (KR); Kwan-Tae Kim, Daejeon (KR); Sungkwon Jo, Daejeon (KR); Yong-Ki Park, Seoul (KR)

(73) Assignees: KOREA INSTITUTE OF MACHINERY & MATERIALS, Daejeon (KR); KOREA RESEARCH INSTITUTE OF CHEMICAL TECHNOLOGY, Daejeon (KR)

(*) Notice: Subject to any disclaimer, the term of this patent is extended or adjusted under 35 U.S.C. 154(b) by 1203 days.

(21) Appl. No.: 16/306,620

(22) PCT Filed: Feb. 1, 2017

(86) PCT No.: PCT/KR2017/001084
§ 371 (c)(1),
(2) Date: Dec. 3, 2018

(87) PCT Pub. No.: WO2017/135679
PCT Pub. Date: Aug. 10, 2017

(65) Prior Publication Data
US 2019/0176141 A1 Jun. 13, 2019

(30) Foreign Application Priority Data
Feb. 1, 2016 (KR) .......................... 10-2016-0012387

(51) Int. Cl.
*B01J 38/14* (2006.01)
*B01J 38/30* (2006.01)
(Continued)

(52) U.S. Cl.
CPC ............... *B01J 38/14* (2013.01); *B01J 38/02* (2013.01); *B01J 38/04* (2013.01); *B01J 38/30* (2013.01);
(Continued)

(58) Field of Classification Search
None
See application file for complete search history.

(56) References Cited

U.S. PATENT DOCUMENTS 2,662,813 A * 12/1953 Packie ..................... B01J 8/44
422/223
2,843,460 A * 7/1958 Borey ..................... B01J 8/28
208/164
(Continued)

FOREIGN PATENT DOCUMENTS

| JP | 01-151943 | 6/1989 |
| JP | 05-320668 | 12/1993 |

(Continued)

*Primary Examiner* — Jennifer A Leung
(74) *Attorney, Agent, or Firm* — Lex Ip Meister, PLLC

(57) ABSTRACT

A catalyst regenerator for regenerating a coked catalyst produced along with a olefin by mixing naphtha and a catalyst with each other to cause a naphtha cracking reaction, and falling from a cyclone which separates the coked catalyst and the olefin produced from the naphtha cracking reaction, includes: a vessel accommodating a catalyst layer formed by stacking the catalyst; a partial oxidation burner producing a high-temperature gas containing solid carbon; and supply nozzles connected to the partial oxidation burner, installed on a bottom of the vessel toward the falling catalyst and the catalyst layer, and spraying the high-temperature gas
(Continued)

containing the solid carbon to the catalyst and the catalyst layer.

5 Claims, 7 Drawing Sheets

(51) Int. Cl.
  *B01J 38/38* (2006.01)
  *C10G 11/18* (2006.01)
  *B01J 38/04* (2006.01)
  *B01J 38/02* (2006.01)
  *C10G 35/04* (2006.01)

(52) U.S. Cl.
  CPC ............ *B01J 38/38* (2013.01); *C10G 11/182* (2013.01); *C10G 35/04* (2013.01); *C10G 2300/70* (2013.01)

(56) References Cited

U.S. PATENT DOCUMENTS

| | | | | |
|---|---|---|---|---|
| 2,902,432 A | * | 9/1959 | Codet | B01J 8/1863 208/113 |
| 3,886,060 A | * | 5/1975 | Owen | C10G 11/05 208/120.01 |
| 4,035,153 A | * | 7/1977 | Bunn, Jr. | B01J 29/90 422/144 |
| 4,060,395 A | * | 11/1977 | Castagnos, Jr. | B01J 8/24 422/144 |
| 4,152,292 A | * | 5/1979 | Conner | B01J 21/20 208/113 |
| 4,272,402 A | * | 6/1981 | Mayes | B01J 8/18 502/40 |
| 5,017,536 A | * | 5/1991 | Skraba | B01J 8/1818 208/163 |
| 7,153,479 B2 | * | 12/2006 | Peterson | B01J 8/003 422/145 |
| 10,596,564 B2 | * | 3/2020 | Lee | B01J 38/04 |
| 2003/0125596 A1 | * | 7/2003 | Lattner | B01J 38/30 585/634 |
| 2009/0035191 A1 | * | 2/2009 | Couch | C10G 11/18 422/144 |
| 2011/0257005 A1 | * | 10/2011 | Niccum | F23C 10/18 502/41 |
| 2014/0221707 A1 | * | 8/2014 | Bones | B01J 8/24 585/240 |
| 2021/0189258 A1 | * | 6/2021 | Jo | B01J 8/20 |

FOREIGN PATENT DOCUMENTS

| | | |
|---|---|---|
| JP | 2012-240022 | 12/2012 |
| JP | 2014-156824 | 8/2014 |
| KR | 10-2014-0037801 | 3/2014 |

\* cited by examiner

CATALYST REGENERATOR AND CATALYST REGENERATION METHOD

TECHNICAL FIELD

The present invention relates to a catalyst regenerator and a catalyst regenerating method. More particularly, the present invention relates to a catalyst regenerator and a catalyst regenerating method of regenerating a coked catalyst in a process of producing olefin from naphtha using a catalyst cracking system.

BACKGROUND ART

Generally, ethylene is a representative material of a basic raw material in a petrochemical field. In a petrochemical process, various materials are produced through various processes based on olefin compounds such as ethylene and propylene.

Olefin is obtained through naphtha cracking or is obtained from ethane. In Korea, the olefin compound such as the ethylene has been mainly produced using the naphtha as a raw material.

In a method of producing the olefin from the naphtha, conventionally, a process was performed at a high temperature of 1000° C. or more using naphtha cracking center (NCC).

Recently, a process of producing the olefin from the naphtha at a temperature lower than about 700° C. using a catalyst has been commercialized.

A case of using the catalyst will be described by way of example. Since the naphtha is supplied together with steam to a lower end of a riser and a regenerated catalyst pushed out from a catalyst regenerator is supplied to the lower end of the riser, a naphtha cracking reaction continuously occurs while the naphtha and the catalyst are mixed with each other and rise along the riser.

The riser is connected to a cyclone provided at an upper portion of the catalyst regenerator. Therefore, a produced olefin gas is separated in the cyclone, exits from a stripper vessel, and is transmitted to a main column of a fluid catalytic cracking (FCC), and a coked catalyst is separated in the cyclone, falls down, and is stacked on the bottom of the catalyst regenerator. A fuel gas is supplied to a waste heat boiler.

The catalyst is coked in a process in which it is subjected to the naphtha cracking reaction in the riser. That is, carbon particles cover a surface of the catalyst.

In addition, in the case of the conventional cracking, the catalyst is used, and the naphtha generates a significantly large amount of coke of about 7% of a weight of the catalyst while being cracked at a high temperature.

This catalyst should be regenerated, be again transmitted to the riser, be mixed with the naphtha, and be used for the naphtha cracking reaction. However, when the catalyst is coked, it is difficult to smoothly cause the naphtha cracking reaction.

Therefore, the coked catalyst falling to the bottom of the catalyst regenerator is regenerated. That is, the regeneration is to burn away the coke attached to the catalyst. In this case, a generated heating value may obtain a temperature rise of about 40 to 60° C. in a regeneration process of the catalyst.

Since the naphtha cracking reaction occurring in the riser is an endothermic reaction, a reaction temperature falls by about 40 to 50° C. while the catalyst rises to an upper end of the riser. In this process, the falling temperature should be compensated for through heat generation in the regeneration process of the catalyst. Therefore, in order to regenerate the catalyst, hot air is supplied from a lower end of the catalyst regenerator. The supplied hot air burns the coke to induce the regeneration of the coked catalyst. The regenerated catalyst is again supplied to the riser, and is used for the naphtha cracking reaction.

However, in a catalyst cracking type advanced catalytic olefin (ACO) process, a reaction temperature is low, such that an amount of generated coke is relatively small (about 2% or less of a weight of the catalyst).

Since the amount of generated coke is small (about 2% or less), even in the case in which all the coke is burned, a temperature rise by about 40 to 60° C. is not implemented. Therefore, in the ACO process, a manner of generating a heating value by spraying a fuel oil to the catalyst and then supplying hot air to the catalyst in contact with the fuel oil to additionally burn the fuel oil has been adopted.

When a liquid-phase fuel oil is sprayed to a catalyst layer having a high density (for example, a density of a catalyst bed is close to a catalyst density), the fuel oil is mixed with the catalyst while being evaporated by a high-temperature atmosphere. However, in this process, mixing non-uniformity between the catalyst and the fuel oil occurs.

Wet non-uniformity of the liquid-phase fuel oil forms a hot spot at which the liquid-phase fuel oil is locally in a high-temperature state in a process in which the liquid-phase fuel oil meets the hot air to be burned. The formation of the hot spot leads to damage to the catalyst, which causes a problem that a significantly large amount of catalyst should be periodically replenished in a reaction system that should be continuously operated.

DISCLOSURE

Technical Problem

The present invention has been made in an effort to provide a catalyst regenerator having advantages of decreasing a hot spot in a process of regenerating a coked catalyst in a process of producing olefin from naphtha using a catalyst cracking system.

Further, the present invention has been made in an effort to provide a catalyst regenerating method having advantages of decreasing a hot spot in a process of regenerating a coked catalyst in a process of producing olefin from naphtha using a catalyst cracking system.

Technical Solution

An exemplary embodiment of the present invention provides a catalyst regenerator for regenerating a coked catalyst produced along with a olefin by mixing naphtha and a catalyst with each other to cause a naphtha cracking reaction (by a riser), and falling from a cyclone which separates the coked catalyst and the olefin produced from the naphtha cracking reaction, including: a vessel accommodating a catalyst layer formed by stacking the catalyst; a partial oxidation burner producing a high-temperature gas containing solid carbon; and supply nozzles connected to the partial oxidation burner, installed on a bottom of the vessel toward the falling catalyst and the catalyst layer, and spraying the high-temperature gas containing the solid carbon to the catalyst and the catalyst layer.

The partial oxidation burner may be a plasma burner partially oxidizing a hydrocarbon-based fuel oil.

The catalyst regenerator may further include: a stand pipe inducing falling of the catalyst; and a dispersing structure provided below the stand pipe and uniformly dispersing the falling catalyst in a circumferential direction.

The dispersing structure may be formed in a conical shape to uniformly induce the falling catalyst in the circumferential direction.

The supply nozzles may be provided in the plural in a circular body disposed in the circumferential direction below and outside the dispersing structure.

The supply nozzles may be provided in the dispersing structure.

Another exemplary embodiment of the present invention provides a catalyst regenerating method of regenerating a coked catalyst in a process of producing olefin from naphtha using a catalyst cracking system, including: a first step of supplying a high-temperature gas containing solid carbon to a catalyst layer; and a second step of coking a catalyst of the catalyst layer by the high-temperature gas and then burning the solid carbon coked on the catalyst to regenerate the catalyst.

The first step may include a step of producing the high-temperature gas containing the solid carbon; and a step of inducing coking on the catalyst.

In the step of producing the high-temperature gas containing the solid carbon, the high-temperature gas containing the solid carbon may be obtained using partial oxidation of a hydrocarbon-based fuel oil.

In the step of producing the high-temperature gas containing the solid carbon, a partial oxidation reaction may be maintained in a set range of an air fuel ratio using a plasma burner, and the high-temperature gas containing the solid carbon may thus be obtained.

In the step of producing the high-temperature gas containing the solid carbon, an air amount supplied to the plasma burner may be adjusted to produce a set temperature and a set amount of solid carbon depending on a condition of catalyst regeneration In the step of producing the high-temperature gas containing the solid carbon, when the air amount supplied to the plasma burner is adjusted to set a first air fuel ratio (low air fuel ratio), the solid carbon may be produced in a first amount (large amount), and a temperature of a reaction product may be set in a first range (500 to 800° C.).

In the step of producing the high-temperature gas containing the solid carbon, when the air amount supplied to the plasma burner is adjusted to set a second air fuel ratio (high air fuel ratio) higher than the first air fuel ratio, the solid carbon may be produced in a second amount (small amount) less than the first amount, and a temperature of a reaction product may be set in a second range (600 to 1000° C.) partially higher than the first range.

In the step of inducing coking on the catalyst, the high-temperature gas containing the solid carbon produced in the step of producing the high-temperature gas containing the solid carbon may be sprayed and supplied into the catalyst layer through supply nozzles.

In the step of inducing coking on the catalyst, a plurality of supply nozzles may be provided and be arranged in a circumferential direction to more uniformly spray and supply the high-temperature gas containing the solid carbon into the catalyst layer.

Advantageous Effects

According to an exemplary embodiment of the present invention, in a process of regenerating a coked catalyst in a process of producing olefin from naphtha using a catalyst cracking system, a high-temperature gas containing solid carbon is produced, such that the solid carbon is uniformly supplied to a catalyst layer. Therefore, the catalyst is uniformly coked by the solid carbon and is then burned to be regenerated.

Since the high-temperature gas transfers the solid carbon into the catalyst layer, the solid carbon is uniformly distributed in the catalyst layer. Therefore, the catalyst is uniformly coked and uniformly burned, such that a hot spot may not be generated.

In addition, since a heating value at the time of burning a coke is less than that depending on burning of the conventional hydrocarbon-based fuel oil due to the solid carbon, the hot spot may not be further generated.

MODE FOR INVENTION

Figure 1:
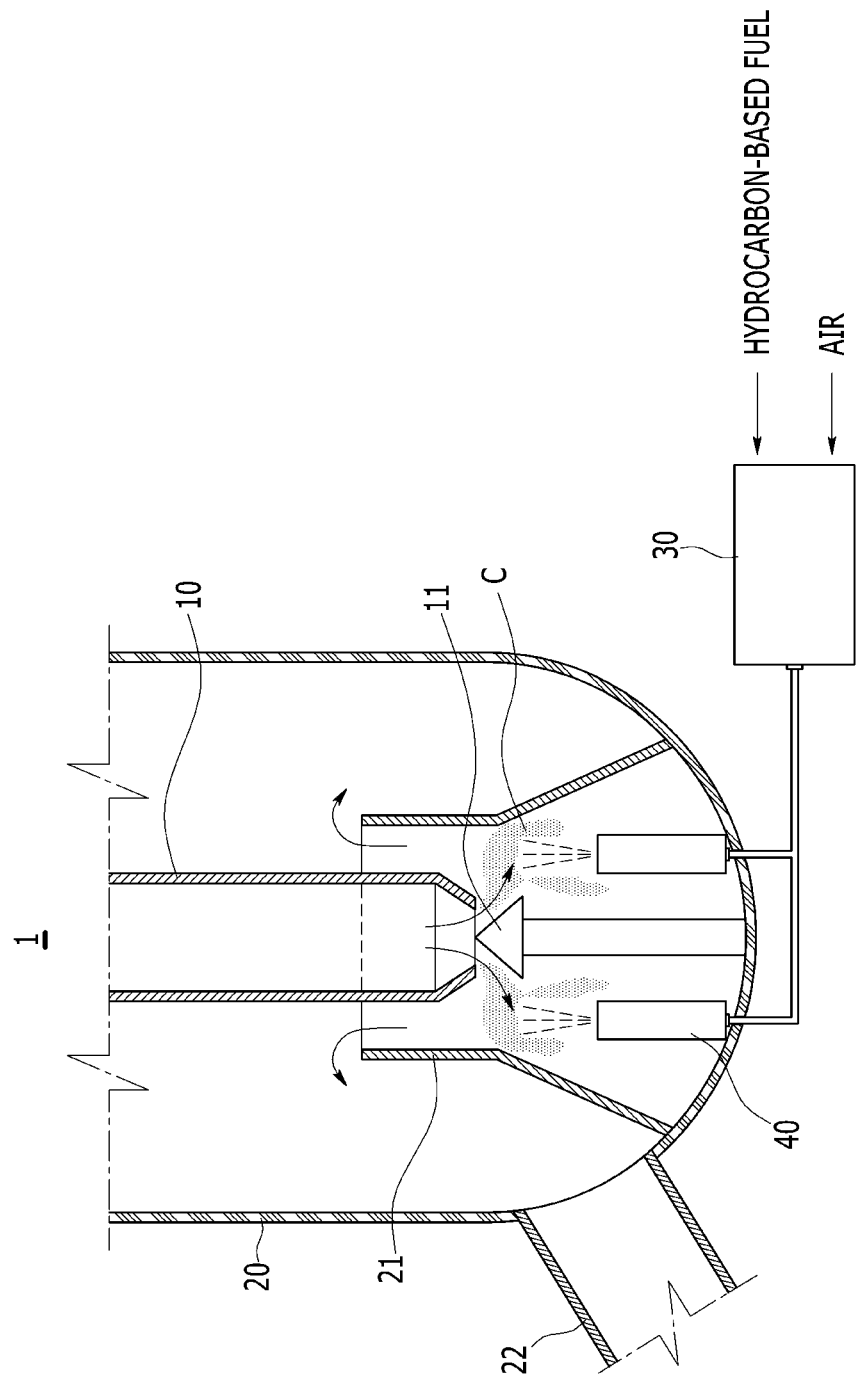
FIG. 1 is a schematic diagram of a catalyst regenerator according to a first exemplary embodiment of the present invention.

Hereinafter, exemplary embodiments of the present invention will be described in detail with reference to the accompanying drawings so that those skilled in the art to which the present invention pertains may easily practice the present invention. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Throughout the present specification, when any portion is referred to as being "connected to" another portion, it includes a case in which any portion and another portion are "indirectly connected to" each other with the other portion interposed therebetween as well as a case in which any portion and another portion are "directly connected to" each other. In addition, throughout the present specification, unless explicitly described to the contrary, the word "comprise" and variations such as "comprises" or "comprising", will be understood to imply the inclusion of stated elements but not the exclusion of any other elements.

FIG. 1 is a schematic diagram of a catalyst regenerator according to a first exemplary embodiment of the present invention. Referring to FIG. 1, a catalyst regenerator 1 according to a first exemplary embodiment is configured to regenerate a coked catalyst produced along with a olefin by mixing naphtha and a catalyst with each other to cause a naphtha cracking reaction, by a riser (not illustrated), and falling from a cyclone (not illustrated) which separates the coked catalyst and the olefin produced from the naphtha cracking reaction.

That is, the naphtha is injected together with steam into a lower portion of the riser, and starts to be cracked through a catalyst reaction while meeting a high-temperature catalyst (including a regenerated catalyst). The naphtha is cracked by continuously reacting to the catalyst while rising along the riser.

After the naphtha cracking reaction, a coked catalyst and olefin produced by the cracking reaction are introduced into the cyclone and are separated from each other. The coked catalyst separated in the cyclone falls down along a stand pipe 10.

A dispersing structure 11 for dispersing the catalyst is provided below the stand pipe 10. The dispersing structure 11 uniformly disperses falling of the coked catalyst from the stand pipe 10 in a circumferential direction.

The catalyst regenerator 1 according to a first exemplary embodiment is configured to regenerate the coked catalyst falling via the stand pipe 10. For example, the catalyst regenerator 1 includes a vessel 20 accommodating the stand pipe 10, a partial oxidation burner 30, and supply nozzles 40.

The dispersing structure 11 provided below the stand pipe 10 induces the falling catalyst to the supply nozzles 40 at the time of opening the standing pipe 10. As an example, the dispersing structure 11 may be formed in a conical shape to induce the falling catalyst in a uniform amount in the circumferential direction.

The vessel 20 accommodates a catalyst layer C formed by stacking the falling catalyst The vessel 20 may include a center well 21 to set a space accommodating the catalyst layer C.

The dispersing structure 11 may allow a uniform amount of catalyst layer C in the circumferential direction in the center well 21. An upper end of the center well 21 accommodates a lower end of the stand pipe 10, and forms a gap G with the lower end of the stand pipe 10 to regenerate the catalyst layer C accommodated in the center well 21 to allow the regenerated catalyst to be transmitted outward of the center well 21.

The vessel 20 includes a regenerated catalyst outlet 22 disposed at one side of the center well 21. The regenerated catalyst outlet 22 is connected to the riser (not illustrated) to discharge and supply the regenerated catalyst regenerated in and discharged from the center well 21 to the riser. The regenerated catalyst supplied to the riser is repeatedly used for the naphtha cracking reaction.

The partial oxidation burner 30 is configured to produce a high-temperature gas containing solid carbon. As an example, the partial oxidation burner 30 may be a plasma burner partially oxidizing a hydrocarbon-based fuel oil.

Generally, in complete oxidation reaction that completely burns a hydrocarbon-based fuel, water and carbon dioxide are produced. However, when an oxygen amount more insufficient than that of complete burning is supplied, a partial oxidation reaction that incompletely burns a hydrocarbon-based fuel occurs.

Even though changed depending on an air fuel ratio, hydrogen, carbon monoxide, hydrocarbon having a low carbon number, solid carbon, carbon dioxide, water, and the like, are produced in the partial oxidation reaction. As described above, the partial oxidation burner 30 products a high-temperature gas containing solid carbon by a plasma reaction, by the hydrocarbon-based fuel and air supplied thereto.

Figure 2:
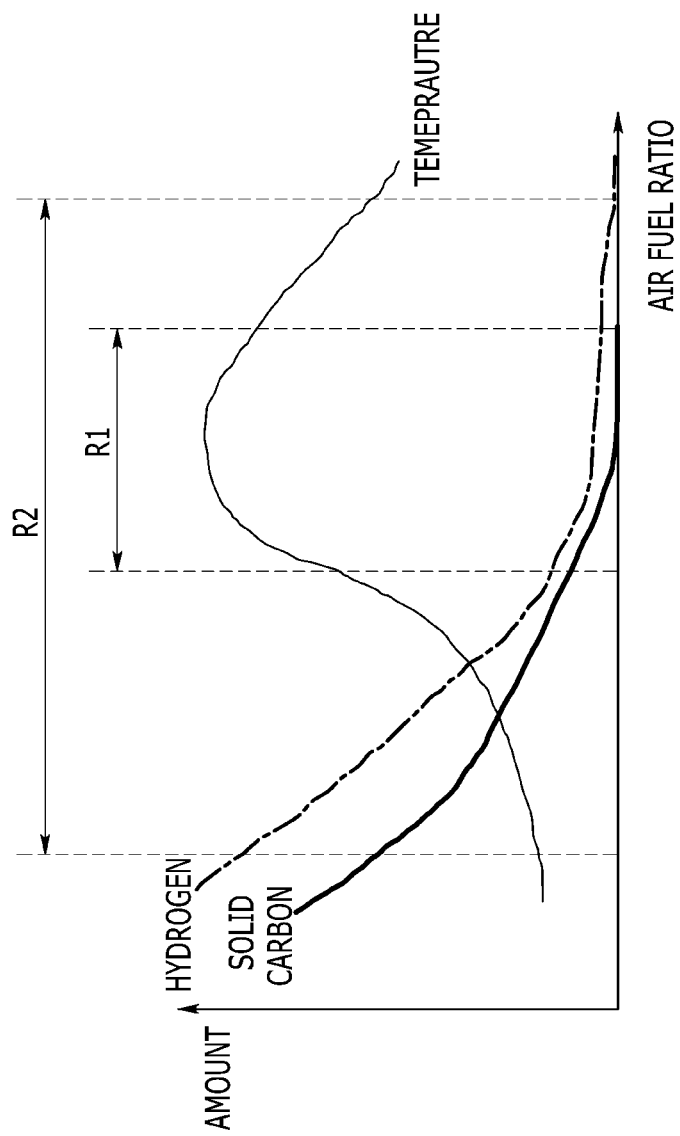
FIG. 2 is graphs illustrating inflammable ranges of a general burner and a plasma burner depending on an air fuel ratio.

FIG. 2 is graphs illustrating inflammable ranges of a general burner and a plasma burner depending on an air fuel ratio. Usually, in a partial oxidation condition, it is difficult to maintain the partial oxidation reaction due to insufficiency of a heating value.

Referring to FIG. 2, the general burner may implement partial oxidation within a very limited inflammable range R1 of the air fuel ratio.

In the case in which the general burner is used as the partial oxidation burner 30, the solid carbon may be produced and supplied within only the limited inflammable range R1 (that is, only in the case in which a temperature is comparatively high).

On the other hand, in the case in which the plasma burner is used as the partial oxidation burner 30, the solid carbon may be produced and supplied within a very wide inflammable range R2 of the air fuel ratio. In addition, the partial oxidation reaction may be continuously maintained while an amount of the generated solid carbon is controlled.

That is, in partial oxidation in which the air fuel ratio is low, large amounts of hydrogen and solid carbon are produced, and in partial oxidation in which the air fuel ratio becomes high (partial oxidation close to complete burning), small amounts of hydrogen and solid carbon are produced while a temperature rises.

In the case in which the air fuel ratio rises in a section in which the air fuel ratio is generally low, a temperature of a gas produced in and discharged from the partial oxidation burner 30 rises, and in the case in which the air fuel ratio rises after the highest temperature, a temperature of a gas produced in and discharged from the partial oxidation burner 30 falls.

The supply nozzles 40 are connected to the partial oxidation burner 30, are installed on the bottom of the vessel 20 toward the falling catalyst and the catalyst layer C, and spray and supply the high-temperature gas containing the solid carbon to the catalyst and the catalyst layer C.

A plurality of supply nozzles 40 may be provided and be arranged at equal intervals in the circumferential direction of the center well 21. Therefore, the supply nozzles 40 arranged at the equal intervals may uniformly spray and supply the high-temperature gas containing the solid carbon to the catalyst layer C stacked in the center well 21.

That is, the solid carbon may be uniformly supplied to and distributed in the catalyst layer C. Therefore, the catalyst may be uniformly coked by the solid carbon and the high-temperature gas and be then uniformly burned to be regenerated.

At the time of burning the solid carbon on the catalyst coked by the solid carbon, a heating value is less than that of the conventional hydrocarbon-based fuel oil, and the solid carbon is uniformly distributed on the catalyst, such that a hot spot is not generated.

Hereinafter, a second exemplary embodiment of the present invention will be described. A description for the same components as those of the first exemplary embodiment in a second exemplary embodiment will be omitted, and components different from those of the first exemplary embodiment in a second exemplary embodiment will be described.

Figure 3:
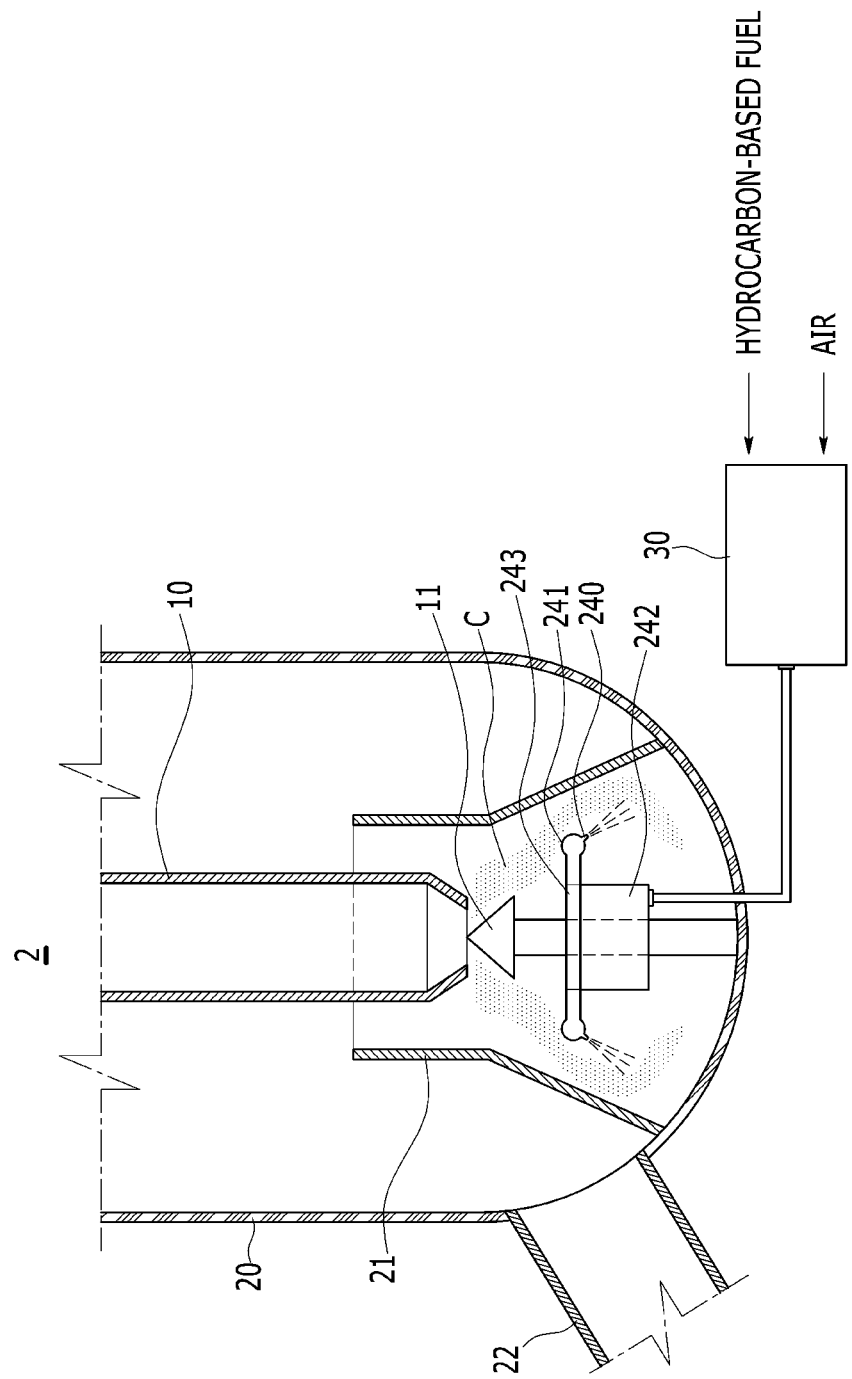
FIG. 3 is a schematic diagram of a catalyst regenerator according to a second exemplary embodiment of the present invention.
Figure 4:
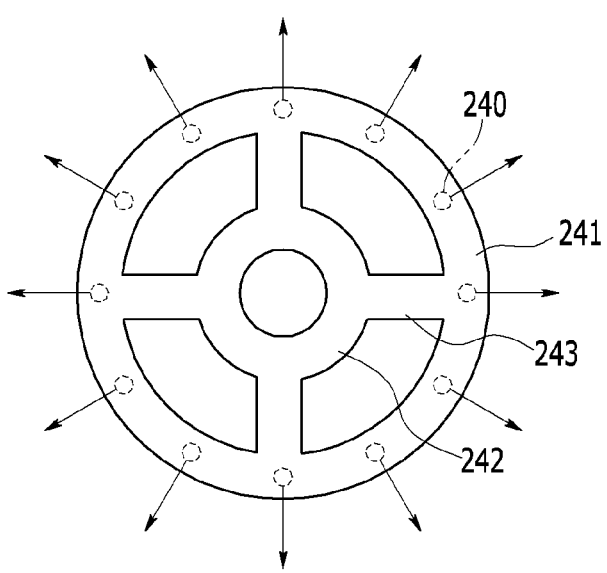
FIG. 4 is a plan view illustrating a supply nozzle used in FIG. 3.

FIG. 3 is a schematic diagram of a catalyst regenerator according to a second exemplary embodiment of the present invention, and FIG. 4 is a plan view illustrating a supply nozzle used in FIG. 3.

Referring to FIGS. 3 and 4, in a catalyst regenerator 2 according to a second exemplary embodiment, a plurality of supply nozzles 240 are provided in a circular body 241 disposed in a circumferential direction below and outside the dispersing structure 11 dispersing the catalyst.

The dispersing structure 11 is provided below the stand pipe 10. The circular body 241 is mounted to a hub 242 installed in the vicinity of the dispersing structure 11 by connection portions 243, and is connected to the partial oxidation burner 30 through the connecting portions 243 and the hub 242.

Therefore, the high-temperature gas containing the solid carbon produced in the partial oxidation burner 30 is supplied to the supply nozzles 240 through the hub 242, the connecting portions 243, and the circular body 241 and is sprayed to the catalyst layer C.

Since the plurality of supply nozzles 240 are arranged at predetermined intervals in the circular body 241 to more uniformly supply the high-temperature gas containing the solid carbon in the circumferential direction, they may more uniformly distribute and supply the solid carbon into the catalyst layer to bring the solid carbon into contact with the catalyst.

In addition, the supply nozzles 240 are provided and spray the high-temperature gas containing the solid carbon, in a direction inclined with respect to a horizontal direction and a vertical direction by a set angle. That is, the high-temperature gas containing the solid carbon, sprayed from the supply nozzles 240 is sprayed to the catalyst layer C toward the vicinity of a direction in which the bottom of the vessel 20 and the center well 21 meet each other. In this case, when the plurality of supply nozzles 240 are configured to be inclined with respect to the horizontal direction and the vertical direction by a plurality of set angles, the solid carbon may be more uniformly sprayed to the catalyst layer C.

That is, solid carbon may be more uniformly distributed in the catalyst layer C by uniform diffusion of the high-temperature gas in the catalyst layer C. Therefore, the catalyst may be uniformly coked by the solid carbon and the high-temperature gas and be then uniformly burned to be regenerated.

Since the solid carbon is uniformly distributed in the catalyst, a hot spot may not be generated in the catalyst layer C due to uniform distribution of burning at the time of burning the solid carbon.

Hereinafter, a third exemplary embodiment of the present invention will be described. A description for the same components as those of the first and second exemplary embodiments in a third exemplary embodiment will be omitted, and components different from those of the first and second exemplary embodiments in a third exemplary embodiment will be described.

Figure 5:
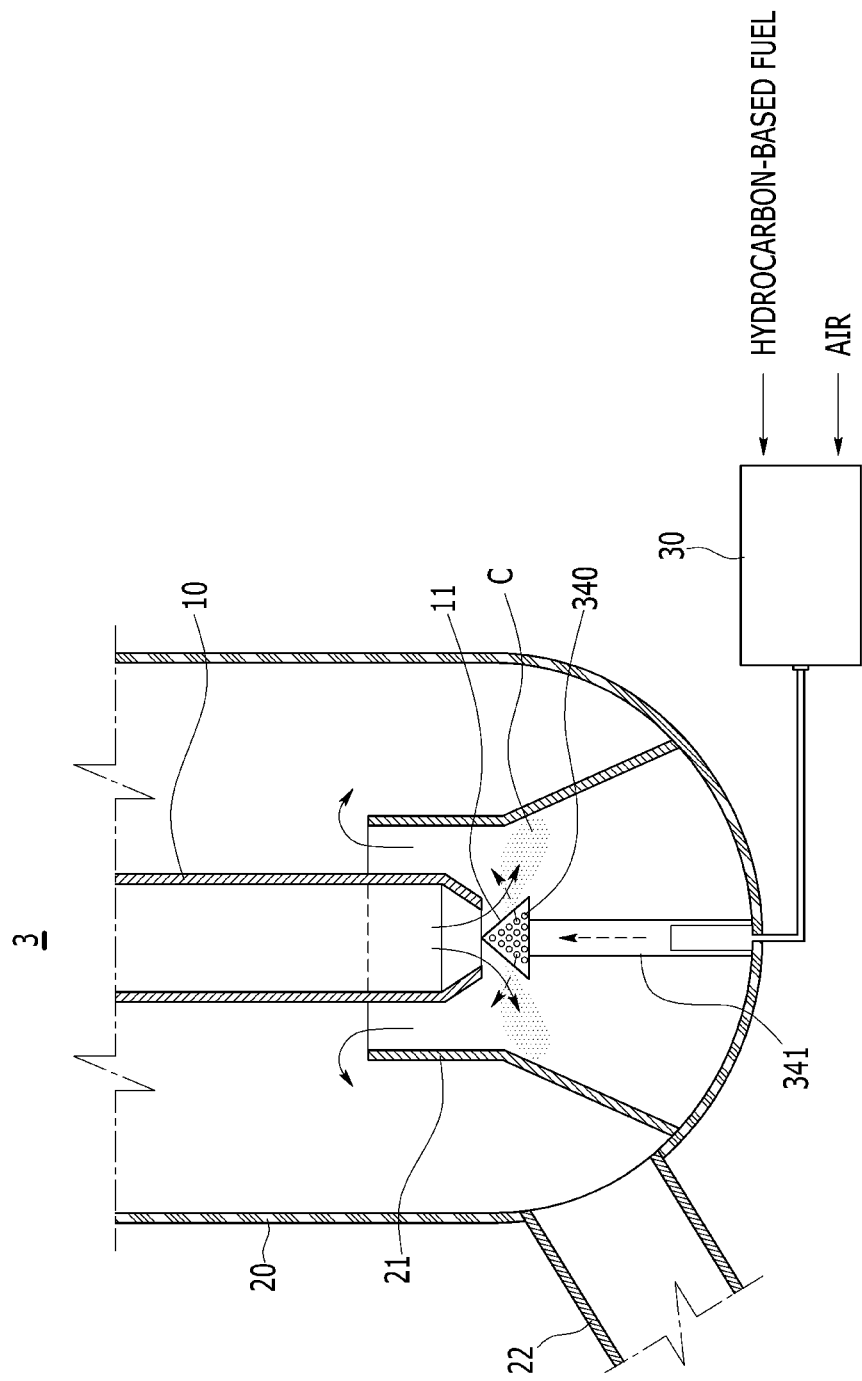
FIG. 5 is a schematic diagram of a catalyst regenerator according to a third exemplary embodiment of the present invention.

FIG. 5 is a schematic diagram of a catalyst regenerator according to a third exemplary embodiment of the present invention.

Referring to FIG. 5, in a catalyst regenerator 3 according to a third exemplary embodiment, supply nozzles 340 are provided in the dispersing structure 11 dispersing the catalyst.

The dispersing structure 11 is provided below the stand pipe 10. The supply nozzles 340 may be formed in an opening shape in an upper surface of the dispersing structure 11, and may be formed of a plurality of openings uniformly distributed in the upper surface of the dispersing structure 11.

Referring to FIG. 5, the supply nozzles 340 may be connected to the partial oxidation burner 30 through a support portion 341 supporting the dispersing structure 11 to the vessel 20, but are not limited thereto. That is, the supply nozzles 340 may also be connected to the partial oxidation burner 30 through a line connected to the partial oxidation burner 30.

Therefore, the high-temperature gas containing the solid carbon, produced in the partial oxidation burner 30 is supplied to a plurality of supply nozzles 340 provided in the dispersing structure 11 to be sprayed to the catalyst layer C.

Since the plurality of supply nozzles 340 are uniformly distributed in the upper surface of the dispersing structure 11 to more uniformly supply the high-temperature gas containing the solid carbon in the circumferential direction, they may more uniformly distribute and supply the solid carbon into the catalyst layer to bring the solid carbon into contact with the catalyst.

Figure 6:
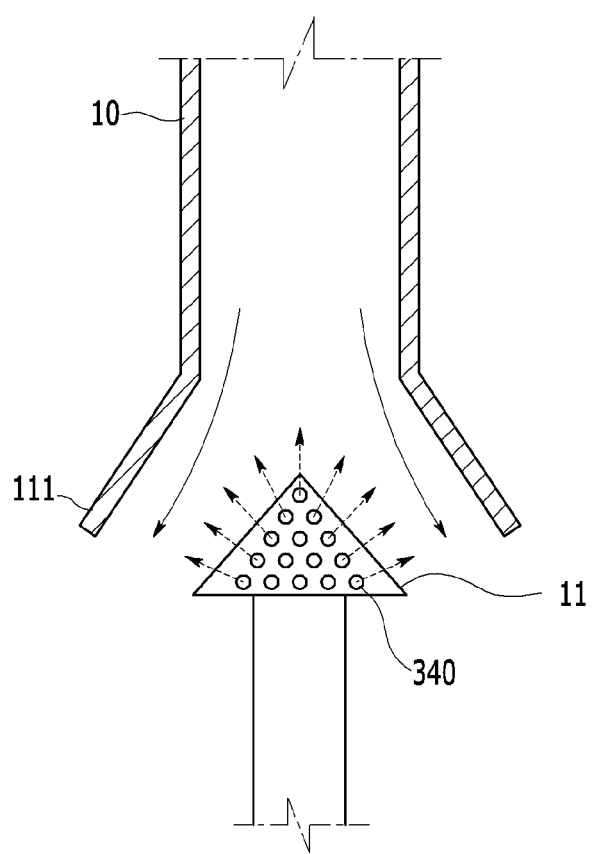
FIG. 6 is a view illustrating a modified example of a stand pipe.

FIG. 6 is a view illustrating a modified example of a stand pipe.

Referring to FIG. 6, a lower end of the stand pipe 10 may be formed to be expanded while extending downward. That is, a pipe expanding portion 111 may be formed at a lower end of the stand pipe 10. The pipe expanding portion 111 may have a form corresponding to that of the dispersing structure 11.

Therefore, in the case in which the plurality of supply nozzles 340 are provided in the dispersing structure 11 as in the third exemplary embodiment described above, the high-temperature gas containing the solid carbon, sprayed from the supply nozzles 340 may more effectively be in contact with the catalyst falling through the pipe expanding portion 111 provided at the lower end of the stand pipe 10. Since the catalyst falling through the lower end of the stand pipe 10 may more easily form the catalyst layer C, the high-temperature gas containing the solid carbon may be effectively in contact with the catalyst layer C.

That is, since the solid carbon may be uniformly distributed in the catalyst layer C, the catalyst may be uniformly coked by the solid carbon and the high-temperature gas and be then uniformly burned to be regenerated.

Since the solid carbon is uniformly distributed in the catalyst, a hot spot may not be generated in the catalyst layer C due to uniform distribution of burning at the time of burning the solid carbon.

However, a case in which a lower end form of the stand pipe 10 illustrated in FIG. 6 is used in a third exemplary embodiment of the present invention for convenience of understanding has been described by way of example, but the lower end form of the stand pipe 10 illustrated in FIG. 6 is not limited thereto, and may also be used in the first and second exemplary embodiments.

Figure 7:
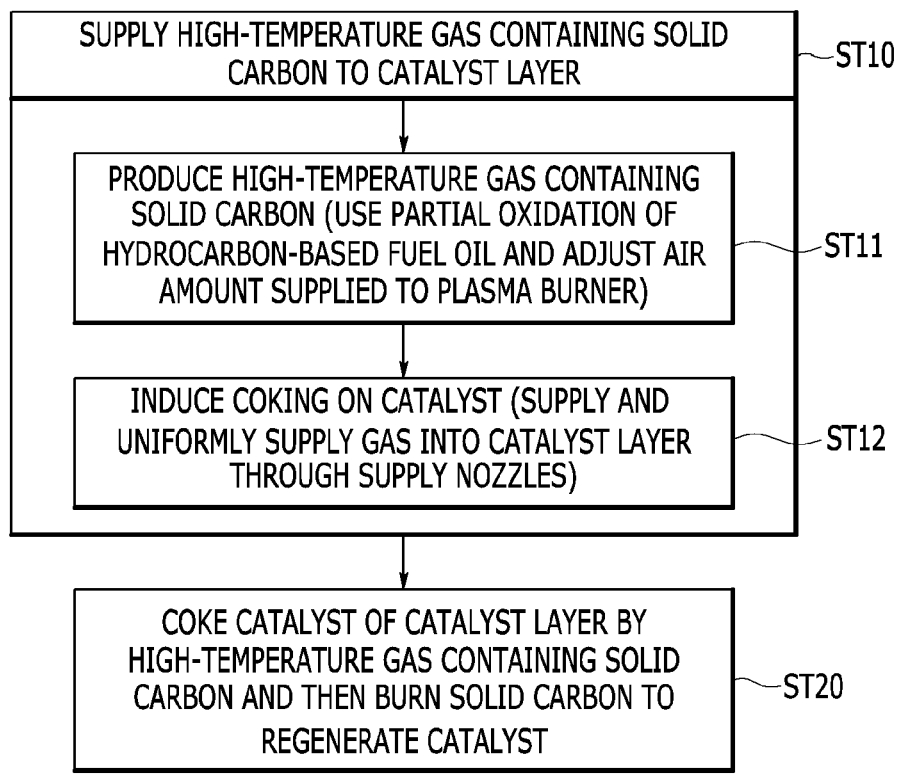
FIG. 7 is a flow chart illustrating a catalyst regenerating method according to an exemplary embodiment of the present invention.

FIG. 7 is a flow chart illustrating a catalyst regenerating method according to an exemplary embodiment of the present invention. Referring to FIG. 7, the catalyst regenerating method according to an exemplary embodiment may be used in a process of regenerating a coked catalyst in a process of producing olefin from naphtha using a catalyst cracking system.

The catalyst regenerating method according to an exemplary embodiment includes a first step (ST10) of supplying a high-temperature gas containing solid carbon to a catalyst layer C and a second step (ST20) of coking a catalyst of the catalyst layer C by the high-temperature gas containing the solid carbon and then burning the solid carbon coked on the catalyst to regenerate the catalyst.

The first step (ST10) includes a step of producing the high-temperature gas containing the solid carbon (ST11) and a step of inducing coking on the catalyst (ST12). As an example, in the step of producing the high-temperature gas containing the solid carbon (ST11), the high-temperature gas containing the solid carbon is obtained using partial oxidation of a hydrocarbon-based fuel oil.

That is, in the step of producing the high-temperature gas containing the solid carbon (ST11), a partial oxidation reaction is maintained in a set range of an air fuel ratio using a plasma burner, and the high-temperature gas containing the solid carbon may thus be obtained. In addition, in the step of producing the high-temperature gas containing the solid carbon (ST11), an air amount supplied to the plasma burner may be adjusted to produce a set temperature and a set amount of solid carbon depending on a condition of catalyst regeneration.

In more detail, in the step of producing the high-temperature gas containing the solid carbon (ST11), when the air amount supplied to the plasma burner is adjusted to set a first air fuel ratio, the solid carbon may be produced in a first amount, and a temperature of a reaction product (for example, the high-temperature gas) may be set in a first range (for example, 500 to 800° C.).

In addition, in the step of producing the high-temperature gas containing the solid carbon (ST11), when the air amount supplied to the plasma burner is adjusted to set a second air fuel ratio higher than the first air fuel ratio, the solid carbon may be produced in a second amount less than the first amount, and a temperature of a reaction product (for example, the high-temperature gas) may be set in a second range (for example, 600 to 1000° C.) partially higher than the first range.

As described above, in the step of producing the high-temperature gas containing the solid carbon (ST11), the temperature of the reaction product and the amount of produced solid carbon may be appropriately set depending on a temperature range condition of the high-temperature gas, which is the reaction product, and a desired reproduction condition of the catalyst.

In the step of inducing coking on the catalyst (ST12), the high-temperature gas containing the solid carbon produced in the step of producing the high-temperature gas containing the solid carbon (ST11) is sprayed and supplied into the catalyst layer C through the supply nozzles 40 (see FIG. 1). In addition, in the step of inducing coking on the catalyst (ST12), the plurality of supply nozzles 240 may be provided and be arranged in the circumferential direction to more uniformly spray and supply the high-temperature gas containing the solid carbon into the catalyst layer C (see FIGS. 2 and 3).

In the second step (ST20), the catalyst of the catalyst layer C is coked by the high-temperature gas containing the solid carbon, produced and supplied in the first step (ST10) and the solid carbon coked on the catalyst is then burned to regenerate the catalyst. The regenerated catalyst is again supplied to the riser, and is mixed with the naphtha to be used for the naphtha cracking reaction.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

| 1, 2: catalyst regenerator | 10: stand pipe |
|---|---|
| 11: dispersing structure | 20: vessel |
| 21: center well | 22: regenerated catalyst outlet |
| 30: partial oxidation burner | 40, 240: supply nozzle |
| 241: circular body | 242: hub |
| 243: connecting portion | C: catalyst layer |
| R1, R2: inflammable range | |

The invention claimed is:

1. A catalyst regenerator for regenerating a coked catalyst produced along with an olefin by mixing naphtha and a catalyst with each other to cause a naphtha cracking reaction, and falling from a cyclone which separates the coked catalyst and the olefin produced from the naphtha cracking reaction, comprising:
a vessel accommodating a catalyst layer formed by stacking the coked catalyst;
a partial oxidation burner producing a high-temperature gas containing solid carbon; and
supply nozzles connected to the partial oxidation burner, arranged toward the coked catalyst, and spraying the high-temperature gas containing the solid carbon to the coked catalyst,
wherein the partial oxidation burner is a plasma burner partially oxidizing a hydrocarbon-based fuel oil.

2. The catalyst regenerator of claim 1, further comprising:
a stand pipe inducing falling of the coked catalyst; and
a dispersing structure provided below the stand pipe and uniformly dispersing the coked catalyst in a circumferential direction.

3. The catalyst regenerator of claim 2, wherein:
the dispersing structure
is formed in a conical shape to induce a uniform dispersion of the coked catalyst in the circumferential direction.

4. The catalyst regenerator of claim 2, wherein:
the supply nozzles
are provided in a circular body disposed in the circumferential direction below and outside the dispersing structure.

5. The catalyst regenerator of claim 2, wherein:
the supply nozzles
are provided in the dispersing structure.

* * * * *